J. P. RANDERSON.
AUTOMOBILE FENDER.
APPLICATION FILED OCT. 14, 1910.

1,021,796. Patented Apr. 2, 1912.

WITNESSES:
Chas. F. Clagett
Mary R. Burke

INVENTOR
John P. Randerson,
BY
Thomas Johnston,
ATTORNEY

UNITED STATES PATENT OFFICE.

JOHN P. RANDERSON, OF ALBANY, NEW YORK.

AUTOMOBILE-FENDER.

1,021,796.  Specification of Letters Patent.  Patented Apr. 2, 1912.

Application filed October 14, 1910. Serial No. 586,999.

*To all whom it may concern:*

Be it known that I, JOHN P. RANDERSON, a citizen of the United States, and resident of Albany, in the county of Albany and State of New York, have invented certain new and useful Improvements in Automobile-Fenders, of which the following is a specification.

My present invention relates to automobile fenders, and has for its object to provide a fender which can be readily turned up or down out of the way, which will occupy a minimum of space, and will at the same time be stronger than any in common use. To this end I construct the fender with a reinforcing bar across the front, and I mount it in telescopic spring supports; the part which moves in and out of the support is provided with a hinge, and is so arranged that when it is drawn forward against the tension of the retaining spring the hinge is pulled out of the tube of the support so that the front bar may be turned up against the radiator, or may, if desired, be allowed to hang down, thus permitting ready access to the crank for starting, or lessening the room required for the machine in the garage. I also arrange for holding the movable part of the fender substantially horizontally rigid, so that it will not rattle or droop after it becomes slightly worn. To this end I arrange a gib on the end part of the telescopic support presently to be described, and support it by a spring, thus forcing the movable part of the fender against the upper surface of the telescope tube.

Figure 1:
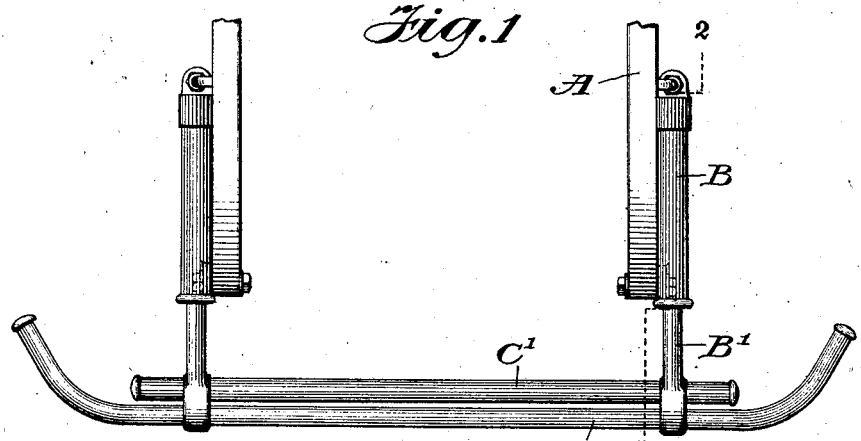
Figure 2:
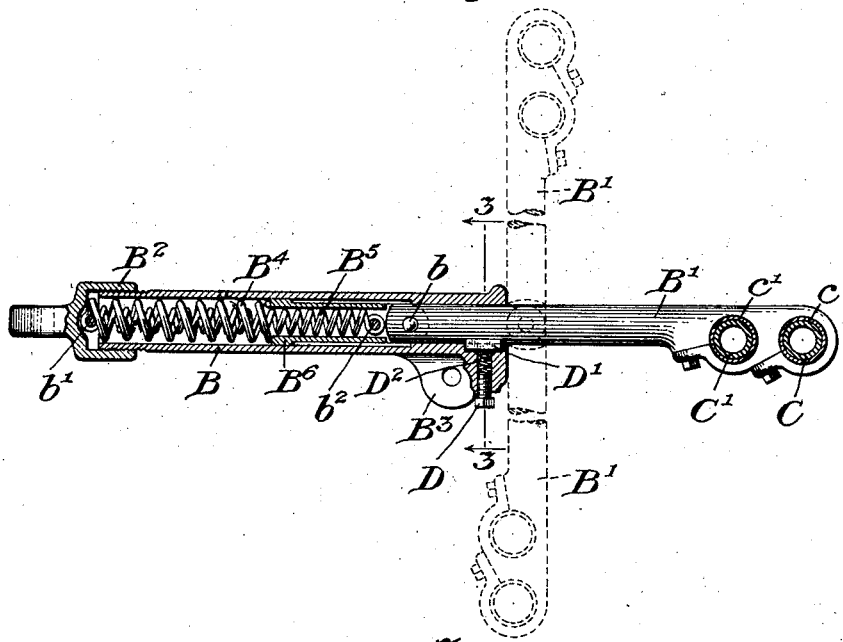
Figure 3:
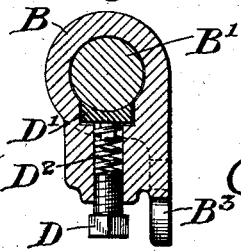

The accompanying drawings show an embodiment of my invention, Figure 1 being a plan view, Fig. 2 being a side elevation, partly in section on the line 2—2 of Fig. 1, and upon an enlarged scale; and Fig. 3 being a section on the line 3—3 of Fig. 2, still more enlarged.

In Fig. 1, A is the reach of the machine to which is fastened the telescopic support B in the usual manner, by bolts through lugs; $B^1$ is the movable part of the support, carrying the bar C of customary form, and also the reinforcing bar $C^1$.

In Fig. 2, B is a telescope tube and $B^1$ is the movable part of the fender; pivoted to the movable part at $b$ is a third member, having shoulders upon its end, which prevents its being drawn too far out of the tube B. Fastened at one end to the pin $b^1$, carried in the cap $B^2$, and at the other end to the pin $b^2$, carried in the sleeve $B^6$, is a tension spring, $B^5$, which serves to keep the movable part of the fender in the tube B. The sleeve $B^6$ abuts against the cushioning spring, $B^4$.

The bar C and the reinforcing bar $C^1$, each composed of the inner iron pipe and an outer brass cover, $c$ $c^1$, are carried in the front end of the sliding bar $B^1$. This I prefer to form of a brass casting, having the openings for the bars formed therein; cutting through into these openings, as shown, they may be drawn close by the bolts in the usual way, clamping the bars C, $C^1$ very firmly in place and rendering the whole structure far more rigid than when only one bar is used, as in the common structure.

In Fig. 3, I show the supporting device referred to, the office of which is to prevent the movable part of the fender having an undue amount of lost motion, making it firmer and preventing its rattling. The gib $D^1$ (see also Fig. 2) bears against the under side of the bar $B^1$ and is forced up by the spring $D^2$, the tension of which may be regulated by the set-screw D.

When the machine is in use the fender will be in the position illustrated in full lines. When, however, the machine is idle, or when it is desired to remove the fender from in front of the crank (not shown) the operator will grasp the bars C $C^1$ and draw forward the supports $B^1$ $B^1$ until the pins $b$ $b$ are sufficiently clear of the tube B to permit the front bars to be turned up or down into the position shown in dotted lines in Fig. 2. This withdraws the sleeve $B^6$ from the cushioning spring $B^4$ and puts the spring $B^5$ under tension. When the fender is desired for use it is simply restored to the position shown in solid lines, the spring $B^5$ retracting the hinge within the tube. The adjustment of the set-screw D is made such that the gib $D^1$ is pressed up firmly against the bar $B^1$, and it in turn is forced against the upper side of the tube B, the pressure being so regulated so as not to obstruct the movement of the bar.

Changes not departing from my invention, such as using, for example, a plurality of parts instead of one, are intended to be covered by my claims.

Having thus described my invention, what I claim and wish to protect by Letters Patent of the United States is:

1. In a fender for automobiles, the combination, with the fender bar, of tubular supports containing cushioning springs, hinged members carrying the bar and passing into the tubular supports, and means for holding the hinges within the tubular supports during operation, such means permitting their withdrawal when desired.

2. In a fender for automobiles, the combination, with the front bar, of tubular supports containing cushioning springs; supports for the front bar composed of two parts hinged together, the hinges being contained within the tubes when the fender is in use; and tension springs holding the hinged supports in place.

3. In a fender for automobiles, the combination, with the front bar and telescoping supports comprising an outer member and an inner member composed of parts hinged together, of means for supporting the inner member closely against one side of the outer member, as described.

4. In a fender for automobiles, the combination, with the front bar, tubular supports attached to the vehicle, hinged members carrying the bar and entering the supports, and cushioning springs therein; of gibs supporting the hinged members and located near the outer ends of the tubes.

5. In a fender for automobiles, the combination, with the front bar, of tubular supports attached to the vehicle, hinged members carrying the bar and entering the supports and cushioning springs therein, of spring-pressed gibs supporting the hinged members and located near the outer ends of the tubes.

6. In a fender for automobiles, the combination, with the front bar, of the tubular supports attached to the vehicle, the hinged members carrying the bar and entering the supports and cushioning springs therein, the spring-pressed gibs supporting the hinged members and located near the outer ends of the tubular supports; and means for changing the tension of the springs.

7. In an automobile fender, the combination, with the front bar, the tubular supports attached to the vehicle and the hinged supports attached to the front bar, of a reinforcing bar adjacent to the front bar and attached to the hinged supports.

8. In an automobile fender, the combination, with the front bar, the tubular supports attached to the vehicle, the cushioning springs therein, and the hinged supports attached to the front bar, of a reinforcing bar attached to the hinged supports.

9. A fender for automobiles, comprising a transversely extending fender bar, resilient means permitting the rearward movement of said bar, a pivotal support for permitting the raising or lowering of the bar, and a lock for normally preventing said raising or lowering, said lock being released upon the forward movement of the bar beyond its normal position.

10. A fender for automobiles, comprising a transversely extending fender bar, means for resiliently holding said bar forward in its normal position, and a lock for preventing the raising or lowering of the bar, said lock being released upon the forward movement of the bar beyond its limiting position.

11. In a fender for automobiles, the combination of a transverse bar, supports for the bar attached to the automobile in substantially the plane of the bar, supports attached to the bar coöperating with the supports upon the automobile and provided with a hinge, buffer springs between the sets of supports, and means for locking the bar substantially in its horizontal plane, such means permitting it to be turned from its horizontal plane when desired.

In testimony whereof, I have hereunto set my hand in the presence of two witnesses.

JOHN P. RANDERSON.

Witnesses:
 Jos. A. Lawson,
 Borden H. Mills.